(12) United States Patent
Kumar et al.

(10) Patent No.: US 8,804,046 B1
(45) Date of Patent: Aug. 12, 2014

(54) METHODS AND SYSTEMS FOR DETECTION OF CHROMA DROPOUTS IN VIDEO

(71) Applicant: Interra Systems, Inc., Cupertino, CA (US)

(72) Inventors: Bhupender Kumar, Palwal (IN); Shekhar Madnani, Noida (IN)

(73) Assignee: Interra Systems Inc., Cupertino, CA (US)

( * ) Notice: Subject to any disclaimer, the term of this patent is extended or adjusted under 35 U.S.C. 154(b) by 0 days.

(21) Appl. No.: 13/871,028

(22) Filed: Apr. 26, 2013

(51) Int. Cl.
*H04N 5/21* (2006.01)
*H04N 9/64* (2006.01)
*H04N 9/68* (2006.01)

(52) U.S. Cl.
CPC .............. *H04N 9/64* (2013.01); *H04N 9/646* (2013.01); *H04N 9/68* (2013.01); *H04N 5/21* (2013.01)
USPC ........... 348/617; 348/607; 348/616; 348/621; 348/242; 348/701; 382/167; 382/163

(58) Field of Classification Search
CPC ........... H04N 9/64; H04N 9/646; H04N 9/68; H04N 5/21; H04N 1/6027
USPC ......... 348/607, 616, 617, 612, 624, 242, 701; 348/191, 621; 382/163, 167; 345/83
See application file for complete search history.

(56) References Cited

U.S. PATENT DOCUMENTS

2013/0321675 A1 * 12/2013 Cote et al. .................... 348/242
2013/0322752 A1 * 12/2013 Lim et al. ..................... 382/167

* cited by examiner

*Primary Examiner* — Jefferey Harold
*Assistant Examiner* — Jean W Desir
(74) *Attorney, Agent, or Firm* — Benjamin A. Balser; Balser & Grell IP Law

(57) ABSTRACT

Systems and methods for detecting chroma dropout errors in one or more fields associated with various video frames are provided. Pixels associated with a current field are divided into a set of pixel pairs. Co-occurrences matrices are calculated for previous and subsequent fields. A first pixel pair associated with the current field is selected. First and second set of entries are selected from the co-occurrence matrices corresponding to the previous and subsequent fields. The first pixel pair is searched in the first and second set of entries. An absence of the first pixel pair in the first and second set of entries satisfies a first criterion of chroma dropout error. Other criteria in addition to the first criterion are evaluated to label the first pixel pair as erroneous.

9 Claims, 6 Drawing Sheets

METHODS AND SYSTEMS FOR DETECTION OF CHROMA DROPOUTS IN VIDEO

TECHNICAL FIELD

The present disclosure is generally related to detection of errors in digital video and, more particularly, is related to methods and systems for detection of chroma dropouts in video.

BACKGROUND

Uncompressed Video in digital format requires large amount of storage space and data transfer bandwidth. Since a large requirement for storage space and data transfer bandwidth translates into an increase in video transmission and distribution costs, compression techniques have been developed to compress the video in a manner to minimize its size while maximizing its quality. Numerous intra- and inter-frame compression algorithms have been developed that compress multiple frames that include frequency domain transformation of blocks within frames, motion vector prediction which reduces the temporal redundancy between the frames, entropy coding etc.

Interframe compression entails synthesizing subsequent images from a reference frame by the use of motion compensation. Motion compensation entails application of motion vector estimation algorithms, for example, block matching algorithm to identify temporal redundancy and differences in successive frames of a digital video sequence and storing the differences between successive frames along with an entire image of a reference frame, typically in a moderately compressed format. The differences between successive frames are obtained by comparing the successive frames with the reference frame which are then stored. Periodically, such as when a new video sequence is displayed, a new reference frame is extracted from the sequence, and subsequent comparisons are performed with this new reference frame. The interframe compression ratio may be kept constant while varying the video quality. Alternatively, interframe compression ratios may be content-dependent, i.e., if the video clip being compressed includes many abrupt scene transitions from one image to another, the compression is less efficient. Examples of video compression which use an interframe compression technique are Moving Picture Experts Group (MPEG), Data Converter Interface (DVI) and Indeo, among others.

Several of these interframe compression techniques, viz., MPEG, use block based video encoding that in turn utilizes Discrete Cosine Transform (DCT) based encoding. The DCT coefficients generated are scanned in zig-zag order and are entropy encoded using various schemes. In addition to encoding of spatial information of the successive frames, the temporal information of the successive frames in terms of motion vectors is also encoded using entropy based schemes.

In addition to the spatial and temporal information, color information corresponding to the successive frames is also compressed by exploiting the poor color acuity of vision. The video signals are represented by a luma component Y' and two chroma components $C_B$ and $C_R$, in which $C_B$ and $C_R$ are the blue-difference and red-difference chroma components, respectively. As long as the luma component Y' is conveyed with full detail, detail in the chroma components $C_B$ and $C_R$ can be reduced by subsampling (filtering, or averaging).

However, there are cases where the encoded stream is captured from a storage media device or through a transmission medium. Due to errors in capturing (such as reading from digital or analog tapes) or transmission medium (over wireless or lossy networks), bit-errors may be introduced that may lead to errors in decoding of captured or received encoded stream. This in turn leads to erroneous decoding/loss of information, i.e., either of the luma Y' and the chroma components $C_B$ and $C_R$. If the aforementioned errors result into loss of information in chroma channels, they are termed as chroma dropout errors. The chroma dropout errors affect a final user viewing experience and it becomes quite important for media service and content providers to verify the quality of the delivered content. The verification can be manual checking of video data but that would be impractical and unreliable.

In light of the above, there is a need for an invention that may enable automated detection of the chroma dropout errors that is accurate and is not computation intensive.

SUMMARY

Example embodiments of the present disclosure provide systems for detecting chroma dropout errors. Briefly described, in architecture, one example embodiment of the system, among others, can be implemented as follows: a pixel-pair creation module, a co-occurrence matrix calculation module, and a chroma dropout error identification module. The chroma dropout error identification module includes a motion estimation module, an effective minimum and maximum computation module, and a pixel pair search module.

Embodiments of the present disclosure can also be viewed as providing methods for detecting chroma dropout errors. In this regard, one example embodiment of such a method, among others, can be broadly summarized by the following steps: grouping a first plurality of pixels associated with the current field into a first set of pixel pairs; calculating a first co-occurrence matrix corresponding to a second set of pixel pairs associated with a previous field, wherein each pixel pair of the second set of pixel pairs corresponds in location to each pixel pair of the first set of pixel pairs, wherein the previous field is a field processed previously having a polarity similar to that of the current field, the second set pixel pairs includes a second plurality of pixels; selecting a first pixel pair associated with the first set of pixel pairs, the first pixel pair includes first and second pixels of the first plurality of pixels, the first and second pixels include first and second chroma values and first and second luma values, respectively; selecting a first set of entries of the first co-occurrence matrix based on the first and second chroma values; determining a presence of the first pixel pair in the first co-occurrence matrix by analysing the first set of entries of the first co-occurrence matrix; calculating a first absolute difference between the first and second chroma values; comparing the first absolute difference with a first predetermined threshold; populating a first table that includes one or more chroma values associated with the second plurality of pixels and a count of pixels corresponding to each of the one or more chroma values; sorting the first table in an ascending order based on the one or more chroma values; selecting a first minimum chroma value from the first table that is a smallest chroma value having a corresponding count of pixels at least one of greater than and equal to a predetermined value; selecting a first maximum chroma value from the first table that is a largest chroma value having a corresponding count of pixels at least one of greater than and equal to the predetermined value; comparing the first and second chroma values with the first minimum and maximum chroma values; calculating a second absolute difference between the first and second luma values; comparing the second absolute difference with a second predetermined threshold; marking a first template block of a predefined size and having a centre within a first predetermined distance from first and second pixels; obtaining a first motion compensated template block in the previous field corresponding to the first template block; calculating a first matching metric corresponding to a first plurality of luma values associated with corresponding pixels of the first template block and the first motion compensated template block; marking the first pixel pair as erroneous when the first matching metric is less than a third predetermined threshold; increasing an error count corresponding to the current field when the first matching metric is less than the third predetermined threshold; and marking the current field as erroneous when the error count is greater than a fourth predetermined threshold.

DETAILED DESCRIPTION

Embodiments of the present disclosure will be described more fully hereinafter with reference to the accompanying drawings in which like numerals represent like elements throughout the several figures, and in which example embodiments are shown. Embodiments of the claims may, however, be embodied in many different forms and should not be construed as limited to the embodiments set forth herein. The examples set forth herein are non-limiting examples and are merely examples among other possible examples.

The present disclosure relates to detecting chroma dropout errors in one or more fields associated with various video frames. The present disclosure discloses methods for processing one or more fields to detect occurrence of chroma dropout errors. Pixels in a field that is currently processed are grouped and subsequently the identified pixel groups are processed to identify the chroma dropout errors. This leads to automation of the error identification process, thereby making chroma dropout error detection practical and reliable. In an example embodiment of the present disclosure, the detection of chroma dropout errors can be performed during video transmission, video display, video transcoding, video post-processing, video quality testing and the like. In light of this, the example embodiments of the present disclosure, enable detection of chroma dropout errors in a quick, accurate, and efficient manner.

Figure 1:
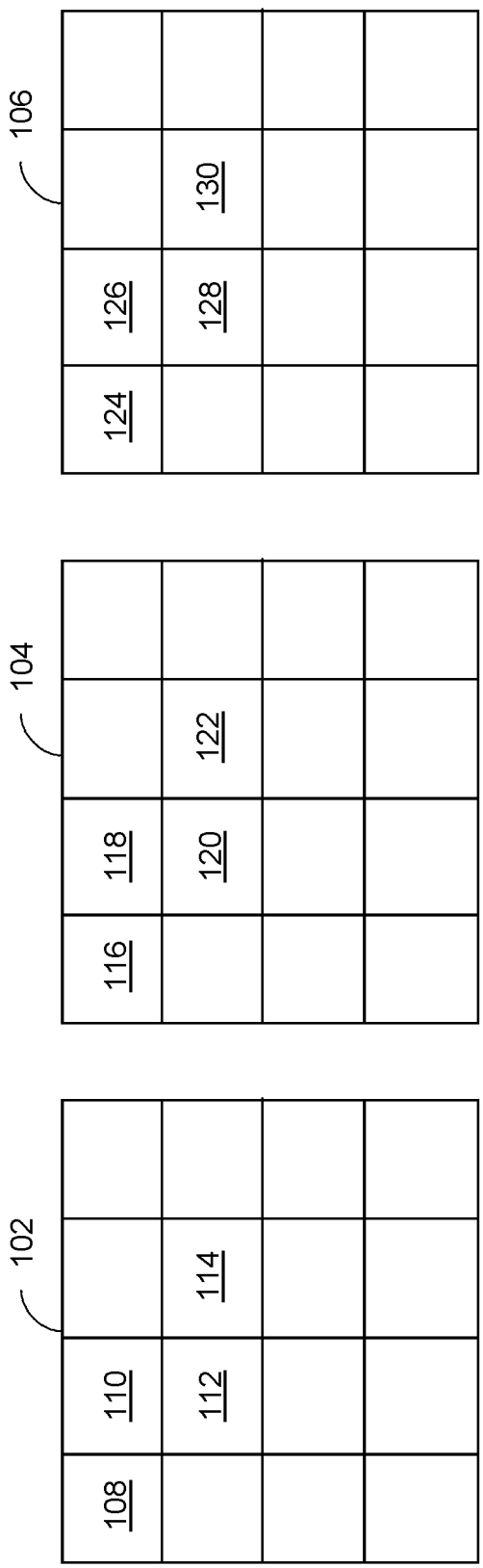
FIG. 1 is a block diagram of current, previous, and subsequent fields, in accordance with an example embodiment of the present disclosure.

Referring now to FIG. 1, a current field 102, a previous field 104, and a subsequent field 106 in accordance with an example embodiment of the present disclosure are shown. Current field 102 includes first through fourth pixels 108-114. Previous field 104 includes fifth through eighth pixels 116-122. Subsequent field 106 includes ninth through twelfth pixels 124-130.

Current, previous, and subsequent fields 102, 104, and 106, respectively, are associated with consecutive video frames that are a part of a video sequence. Current field 102 is a field that is being processed in a current processing cycle of a system for detecting chroma dropout errors. Previous field 104 is a field that has a polarity identical to that of the current field 102 and was processed in a previous processing cycle of the system for detecting chroma dropout errors. Subsequent field 106 is a field that has a polarity identical to that of the current and previous fields 102 and 104 and is processed in a processing cycle subsequent to the current processing cycle of the system for detecting chroma dropout errors. Current, previous, and subsequent fields 102, 104, and 106 are composed of a plurality of pixels, such as current field 102 includes first through fourth pixels 108-114, and previous field 104 includes fifth through eighth pixels 116-122. The system for detecting chroma dropout errors executes various steps to identify occurrence of chroma dropout errors in one or more fields, for example current, previous, and subsequent fields 102, 104, and 106. Chroma dropout errors are detected by grouping the plurality of pixels, for example first through fourth pixels 108-114, into one or more sets of pixel pairs. In an embodiment of the present invention, first through fourth pixels 108-114 are grouped to form diagonal pixel pairs. In an embodiment of the present invention, first through fourth pixels 108-114 are grouped based on at least one of horizontal, vertical or any other neighborhood configuration. Thus, a first pixel pair includes first and third pixels 108 and 112, and a second pixel pair includes second and fourth pixels 110 and 114. Pixels associated with previous and subsequent fields 104 and 106, viz., fifth through twelfth pixels 116-130 and corresponding to the pixels associated with current field 102 are grouped in a manner identical to the grouping of the pixels associated with current field 102. Therefore, a third pixel pair associated with previous field 104 includes fifth and seventh pixels 116 and 120, and a fourth pixel pair includes sixth and eighth pixels 118 and 122. Similarly, a fifth pixel pair associated with subsequent field 106 includes ninth and eleventh pixels 124 and 128 and a sixth pixels pair includes tenth and twelfth pixels 126 and 130.

Each of the first through sixth pixel pairs is processed further to ascertain occurrence of chroma dropout errors. The various blocks entailing the detection of the chroma dropout errors are described in detail in conjunction with FIGS. 2A, 2B, 2C, 2D, and 3.

Figure 2A:
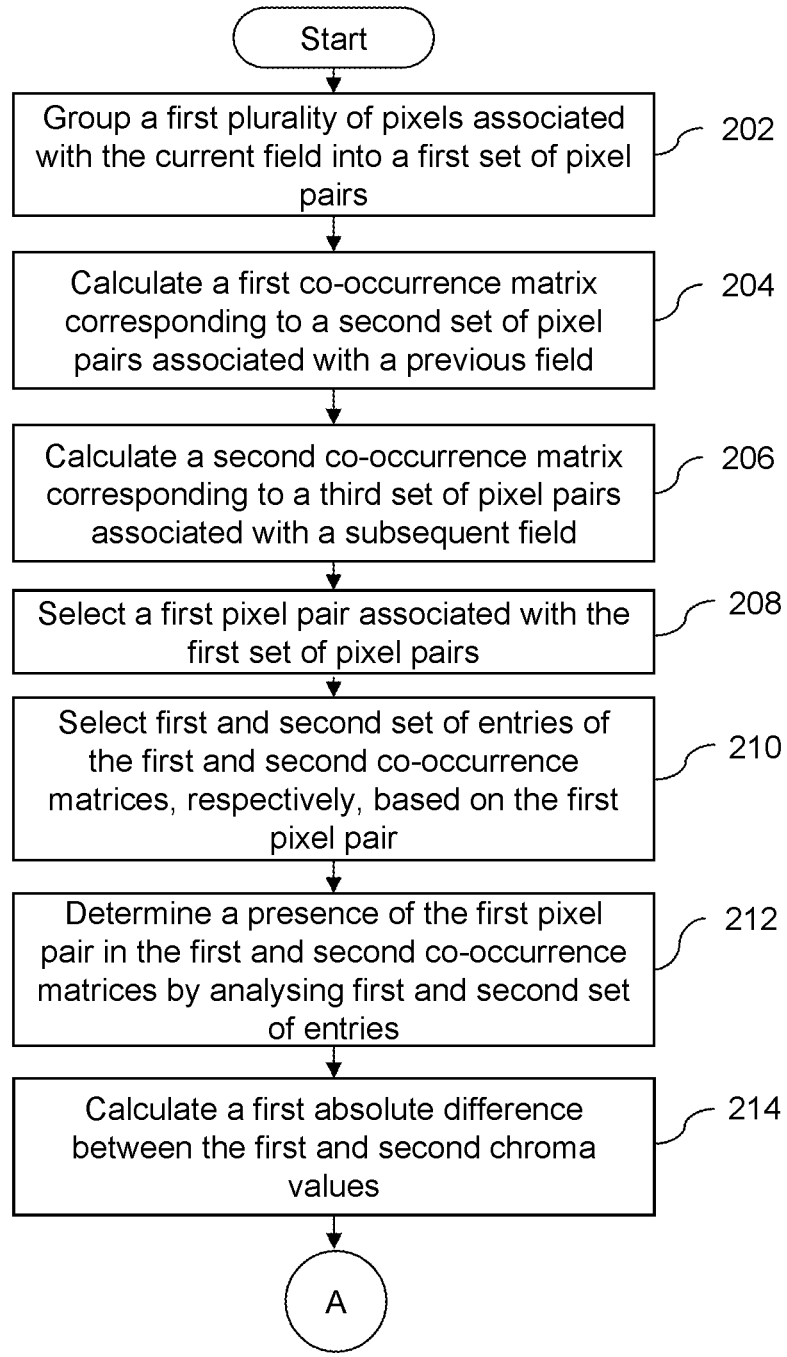
FIGS. 2A, 2B, 2C, and 2D are a flow chart of a method for detecting one or more chroma dropout errors, in accordance with an example embodiment of the present disclosure.
Figure 2B:
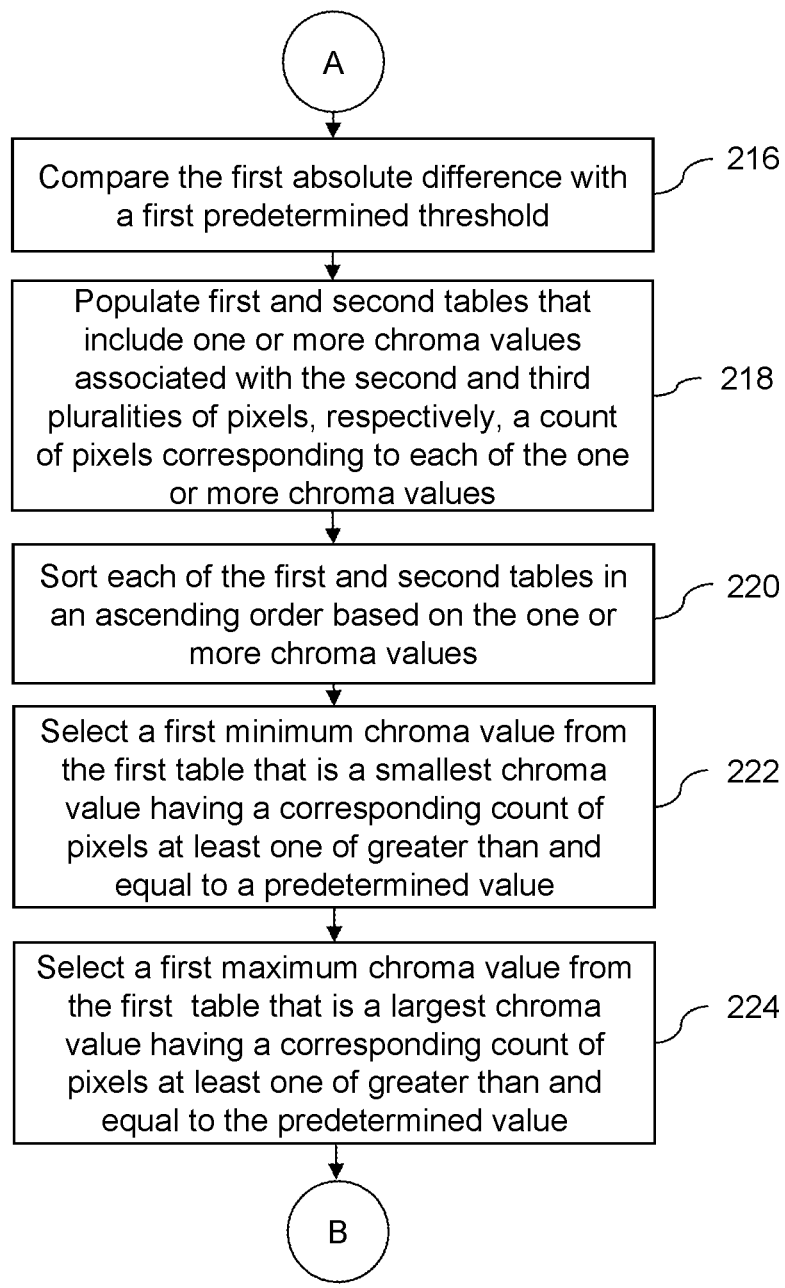
Figure 2C:
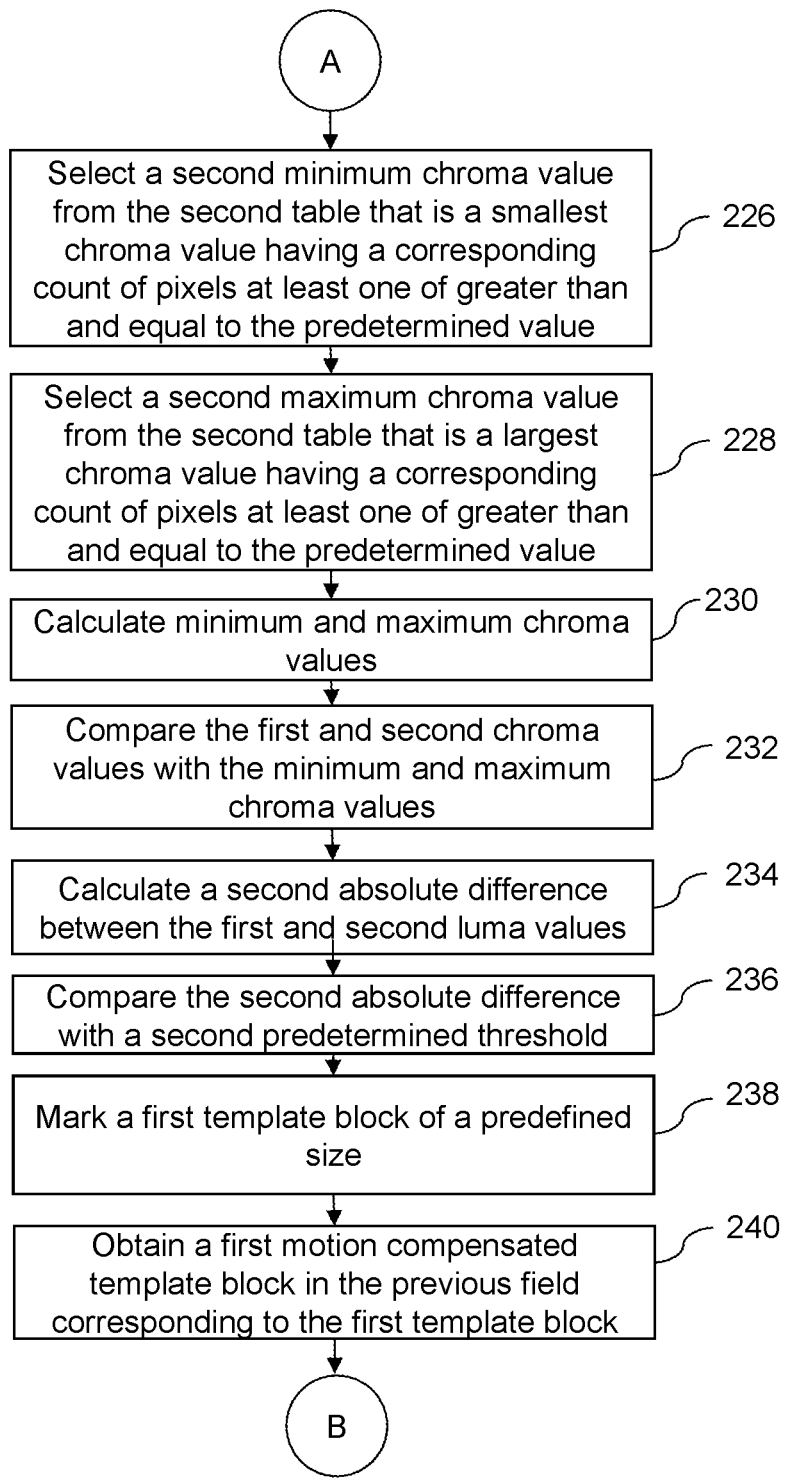
Figure 2D:
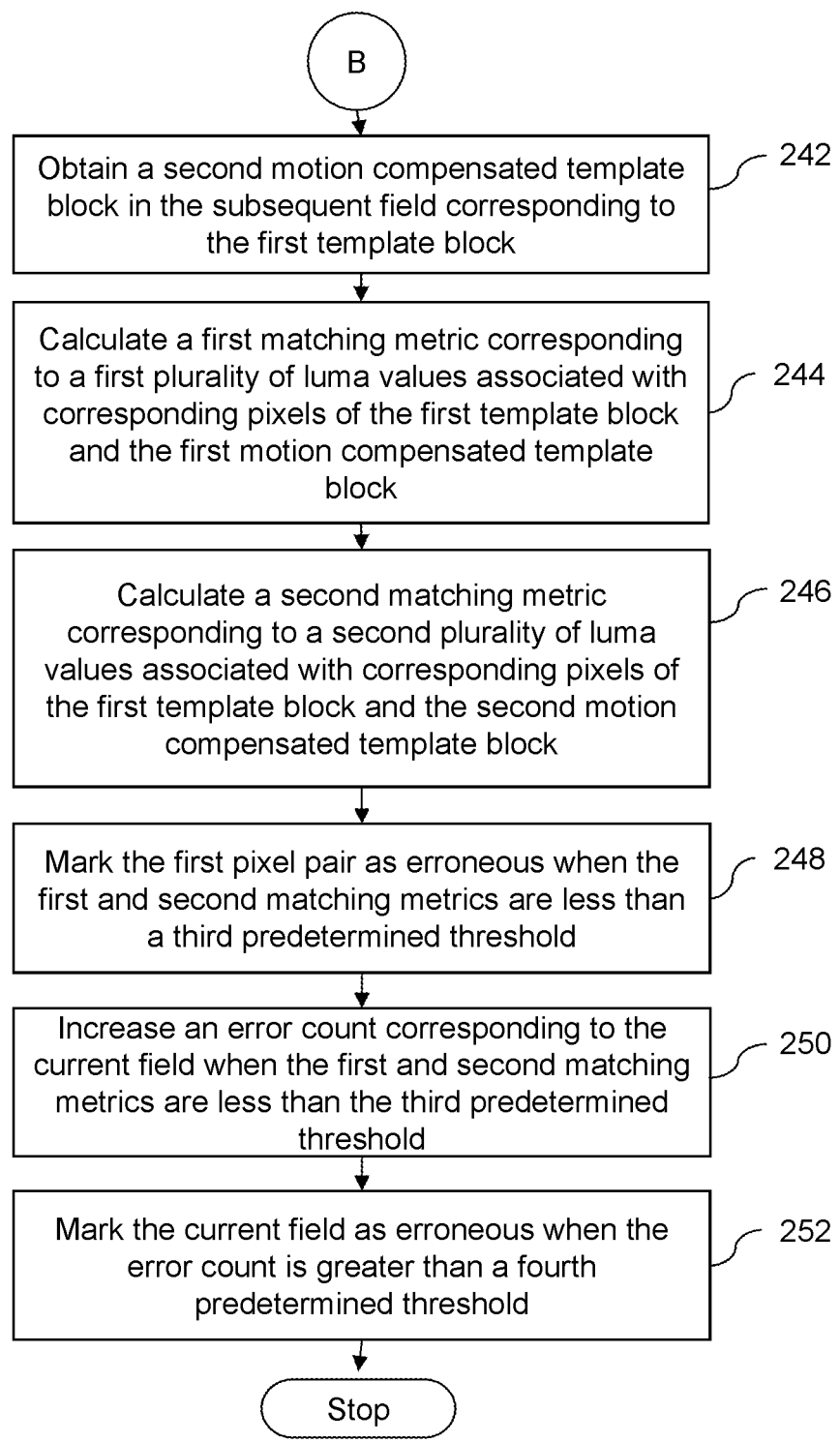

Referring now to FIGS. 2A, 2B, 2C, and 2D, a flowchart of a method for detecting one or more chroma dropout errors, in accordance with an example embodiment of the present disclosure is shown. FIGS. 2A and 2B will be explained in conjunction with FIG. 1.

In block 202, a first plurality of pixels, viz., first through fourth pixels 108-114, associated with current field 102 is divided into a first set of pixel pairs. In an embodiment of the present invention, two pixels lying diagonally to one another are grouped into a pixel pair. For example, the first pixel pair includes first and third pixels 108 and 112. In another embodiment of the present invention, two neighboring pixels lying in one row are grouped into a pixel pair. For example, first and second pixels 108 and 110 may be grouped together. In block 204, a first co-occurrence matrix corresponding to a second set of pixel pairs associated with previous field 104 is calculated such that an entry at row i and column j of the first co-occurrence matrix represents a count of pixel pairs having chroma values i and j. The second set of pixel pairs includes pixel pairs formed by grouping a second plurality of pixels associated with previous field 104 and corresponding in position to the first plurality of pixels associated with current field 102 in a manner identical to grouping of the first plurality of pixels. Thus, the second set of pixel pairs includes the third pixel pair that includes fifth and seventh pixels 116 and 120 and the fourth pixel pair that includes sixth and eighth pixels 118 and 122. Since, calculation of a co-occurrence matrix is a known in the art procedure a detailed explanation has been excluded from the present description for the sake of brevity.

In block 206, a second co-occurrence matrix corresponding to a third set of pixel pairs associated with subsequent field 106 is calculated in a manner identical to that of the first co-occurrence matrix. The third set of pixel pairs includes pixel pairs formed by grouping a third plurality of pixels associated with subsequent field 106 and corresponding in position to the first plurality of pixels associated with current field 102 in a manner identical to grouping of the first plurality of pixels. Thus, the third set of pixel pairs includes the fifth pixel pair that includes ninth and eleventh pixels 124 and 128 and the sixth pixel pair that includes tenth and twelfth pixels 126 and 130. In block 208 the first pixel pair that includes first and third pixels 108 and 112 is selected. The first and third pixels include first and third chroma values, and first and third luma values, respectively. In block 210, a first set of entries of the first co-occurrence matrix is selected based on the first and third chroma values. In an embodiment of the present invention, entries lying within a predetermined range of the first and third chroma values are selected. For example, if the first and third chroma values are 20 and 30, respectively and the predetermined range is defined as 5, then the entries of the first co-occurrence matrix lying in a rectangle having diagonal vertices (20-5, 30-5), i.e, (15,25) and (20+5, 30+5), i.e., (25,35) are selected. Similarly, a second set of entries of the second co-occurrence matrix is selected based on the first and third chroma values. In block 212, presence of the first pixel pair is determined in the first and second co-occurrence matrices, respectively, by analysing the first and second set of entries. If the first pixel pair is not present in either of the first and second set of entries then a first criterion for chroma dropout error is satisfied.

In block 214, a first absolute difference between the first and third chroma values is calculated. In block 216, the first absolute difference is compared with a first predetermined threshold. If the first absolute difference is greater than the first predetermined threshold then a second criterion for chroma dropout error is satisfied.

In block 218, first and second tables are populated that include one or more chroma values associated with the second and third pluralities of pixels, respectively, and a count of pixels corresponding to each of the one or more chroma values associated with the second and third pluralities of pixels, respectively. In block 220, each of the first and second tables is sorted in an ascending order based on the one or more chroma values associated with the second and third pluralities of pixels, respectively. In block 222, a first minimum chroma value is selected from the first table that is a smallest chroma value having a corresponding count of pixels that is either greater than or equal to a predetermined value. In block 224, a first maximum chroma value is selected from the first table that is a largest chroma value having a corresponding count of pixels that is either greater than or equal to the predetermined value.

In block 226, a second minimum chroma value is selected from the second table that is a smallest chroma value having a corresponding count of pixels that is either greater than or equal to a predetermined value. In block 228, a second maximum chroma value is selected from the second table that is a largest chroma value having a corresponding count of pixels that is either greater than or equal to the predetermined value. In block 230, a minimum chroma value that is smaller of the first and second minimum chroma values is calculated. Further, a maximum chroma value that is larger of the first and second maximum chroma values is calculated. In block 232, the first and second chroma values are compared with the minimum and maximum chroma values. If the first and second chroma values do not lie in the range defined by the maximum and minimum chroma values, then a third criterion for chroma dropout error is satisfied. If all the first, second, and third criteria for chroma dropout errors are satisfied then block 234 is executed else the first pixel pair is discarded as error free and the processing of the first pixel pair is terminated and a second pixel pair is selected for processing.

In block 234, a second absolute difference between the first and third luma values is calculated. In block 236, the second absolute difference is compared with a second predetermined threshold. If the second absolute difference is greater than the second predetermined threshold then it implies that an edge is present in a luma plane at a position corresponding to the first pixel pair. Therefore, the first pixel pair is discarded as error free and the processing of the first pixel pair is terminated and a second pixel pair is selected for processing. However, if the second absolute difference is less than the second predetermined threshold block 238 is executed. In block 238 a first template block is marked in a luma (Y') channel of current field 102. The first template block has a predefined size and has a centre within a first predetermined distance from first and third pixels 108 and 112. In block 240, a first motion compensated template block is obtained in the luma Y' channel of previous field 104 that corresponds to the first template block. Since motion compensation is well-known, a detailed description has been excluded from the present description for the sake of brevity. In block 242, a second motion compensated template block is obtained in the luma Y' channel of subsequent field 106 that corresponds to the first template block. In block 244, a first matching metric is calculated that corresponds to a first plurality of luma values associated with corresponding pixels of the first template block and the first motion compensated template block. In an embodiment of the present invention, the first matching metric is at least one of sum of absolute differences (SAD), sum of squared differences (SSD), correlation coefficient, and structural similarity (SSIM) index etc. In block 246, a second matching metric is calculated that corresponds to a second plurality of luma values associated with corresponding pixels of the first template block and the second motion compensated template block. In an embodiment of the present invention, the second matching metric is at least one of SAD, SSD, correlation coefficient, and SSIM index etc. In block 248, the first pixel pair is marked as erroneous when the first and second matching metrics are less than a third predetermined threshold. In block 250, an error count corresponding to current field 102 is increased by one when the first and second matching metrics are less than the third predetermined threshold. In block 252, current field 102 is marked as erroneous if the error count corresponding to current field 102 becomes greater than a fourth predetermined threshold. The processing of the first pixel pair is terminated and a second pixel pair is selected and the above described steps are repeated.

Figure 3:
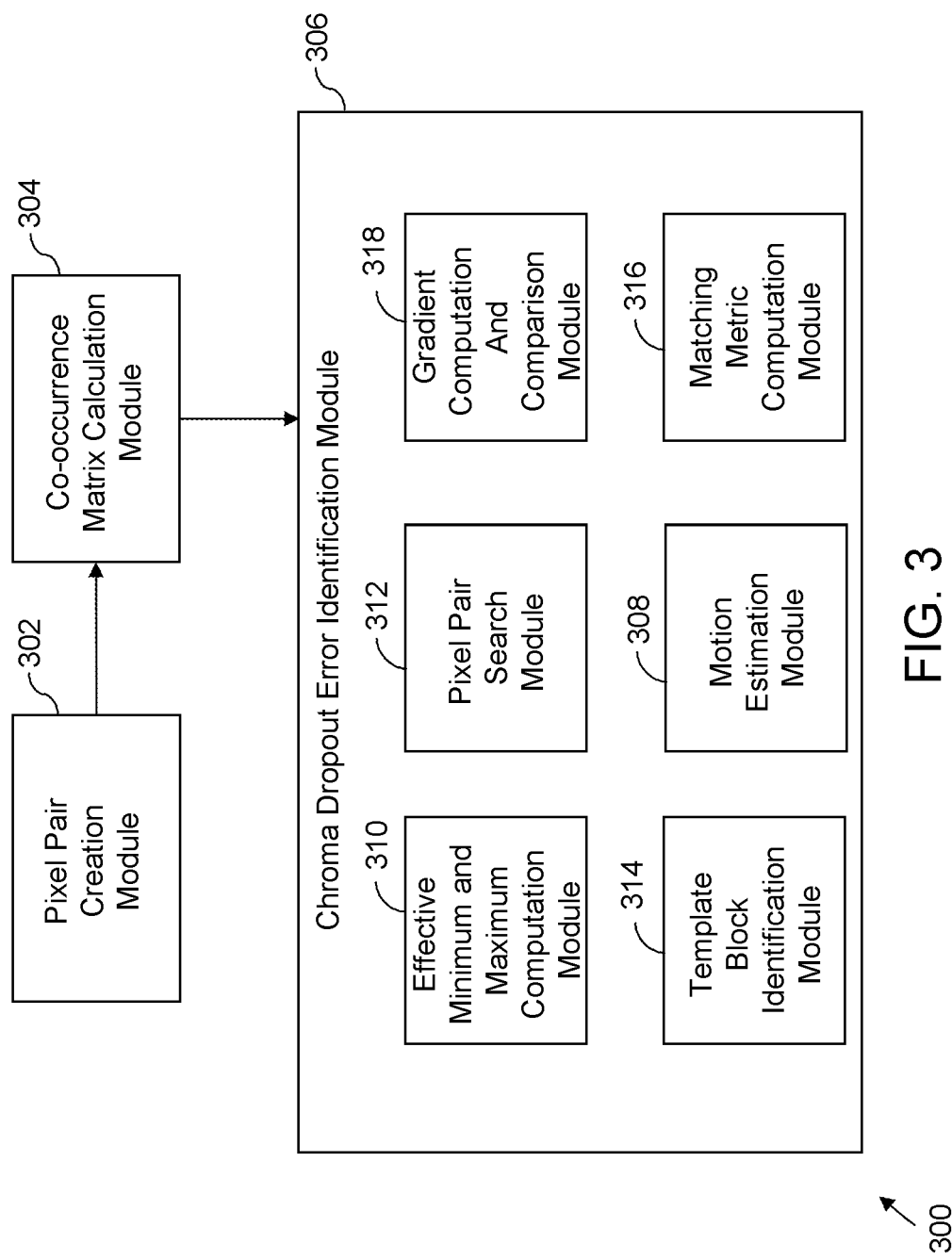
FIG. 3 is a block diagram of a system for detecting chroma dropout errors, in accordance with an example embodiment of the present disclosure.

Referring now to FIG. 3, a block diagram of a system 300 for detecting chroma dropout errors, in accordance with an example embodiment of the present disclosure is shown. System 300 includes a pixel-pair creation module 302, a co-occurrence matrix calculation module 304, and a chroma dropout error identification module 306. Chroma dropout error identification module 306 includes a motion estimation module 308, an effective minimum and maximum computation module 310, a pixel pair search module 312, a template block identification module 314, a matching metric computation module 316, and a gradient computation and comparison module 318. FIG. 3 will be explained in conjunction with FIGS. 1, and 2A, 2B, 2C, and 2D.

Pixel-pair creation module 302 groups the first plurality of pixels, viz., first through third pixels 108-114 associated with current field 102 into the first and second pixel pairs as described in detail in conjunction with block 202. The first and second pixel pairs are transmitted to co-occurrence matrix calculation module 304. Additionally, information corresponding to previous and subsequent fields 104 and 106, respectively, is also provided to co-occurrence matrix calculation module 304. Co-occurrence matrix calculation module 304 calculates the first and second co-occurrence matrices corresponding to previous and subsequent fields 104 and 106, respectively, in a manner described in detail in conjunction with blocks 204 and 206. The first and second co-occurrence matrices are transmitted to chroma dropout error identification module 306. The first pixel pair and the first and second co-occurrence matrices are internally transmitted to pixel-pair search module 312. Pixel-pair search module 312 selects the first and second set of entries corresponding to the first and second co-occurrence matrices based on the first and third chroma values as described in detail in conjunction with block 210. Pixel-pair search module 312 determines the presence of the first pixel pair in the first and second set of entries. If the first pixel pair is not present in the first and second set of entries, the first criterion for chroma dropout error is satisfied. Gradient computation and comparison module 318 calculates the first absolute difference between the first and third chroma values and compares the first absolute difference with the first predetermined threshold. If the first absolute difference is greater than the first predetermined threshold, the second criterion for chroma dropout error is satisfied.

Effective minimum and maximum computation module 310 is provided previous and subsequent fields 104 and 106 for obtaining the minimum and maximum chroma values. Effective minimum and maximum computation module 310 populates the first and second tables that include the chroma values associated with the second and third pluralities of pixels, respectively, and the count of pixels corresponding to each of the chroma values associated with the second and third pluralities of pixels, respectively. As mentioned above the second and third pluralities of pixels are associated with previous and subsequent fields 104 and 106, respectively. Effective minimum and maximum computation module 310 sorts each of the first and second tables in an ascending order based on the chroma values associated with the second and third pluralities of pixels, respectively. Effective minimum and maximum computation module 310 obtains the minimum and maximum chroma values in a manner described in detail in conjunction with blocks 222-228. Effective minimum and maximum computation module 310 compares the first and third chroma values with the minimum and maximum chroma values. If the first and third chroma values do not lie in a range defined by the minimum and maximum chroma values then then the third criteria for the chroma dropout error is satisfied.

If the first, second, and third criteria for chroma dropout error are satisfied, then gradient computation and comparison module 318 calculates the second absolute difference between the first and third luma values. The second absolute difference is compared with the second predetermined threshold. If the second absolute difference is greater than or equal to the second predetermined threshold, gradient computation and comparison module 318 infers that an edge is present in the luma plane at the position corresponding to the first pixel pair. Therefore, the first pixel is discarded as error free. However, if the second absolute difference is less than the second predetermined threshold, template block identification module 314 marks the first template block in current field 102. The first template block has the predefined size and has the centre within the first predetermined distance from first and third pixels 108 and 112. Template block identification module 314 transmits the first template block to motion estimation module 308.

Motion estimation module 308 obtains the first motion compensated template block in previous field 104 that corresponds to the first template block and the second motion compensated template block in subsequent field 106 that corresponds to the first template block. Motion estimation module 308 transmits the first and second motion compensated template blocks to matching metric computation module 316 for calculating the first and second matching metrics. The first matching metric corresponds to the first plurality of luma values associated with corresponding pixels of the first template block and the first motion compensated template block. In an embodiment of the present invention, the first matching metric is at least one of SAD, SSD, correlation coefficient, and SSIM index. The second matching metric corresponds to the second plurality of luma values associated with corresponding pixels of the first template block and the second motion compensated template block. Matching metric computation module 316 marks the first pixel pair as erroneous when the first and second matching metrics are less than the third predetermined threshold and increments an error count corresponding to current field 102. Further, matching metric computation module 316 marks current field 102 as erroneous if the error count corresponding to current field 102 becomes greater than a fourth predetermined threshold. Subsequently, the processing of the first pixel pair is terminated and a second pixel pair is selected and the above described steps are repeated.

The flow charts of FIGS. 2A, 2B, 2C, and 2D show the architecture, functionality, and operation of a possible implementation of detection of chroma dropout software. In this regard, each block may represent a module, segment, or portion of code, which comprises one or more executable instructions for implementing the specified logical function(s). It should also be noted that in some alternative implementations, the functions noted in the blocks may occur out of the order noted in FIGS. 2A, 2B, 2C, and 2D. For example, two blocks shown in succession in FIGS. 2A, 2B, 2C, and 2D may in fact be executed substantially concurrently or the blocks may sometimes be executed in the reverse order, depending upon the functionality involved. Any process descriptions or blocks in flow charts should be understood as representing modules, segments, or portions of code which include one or more executable instructions for implementing specific logical functions or steps in the process, and alternate implementations are included within the scope of the example embodiments in which functions may be executed out of order from that shown or discussed, including substantially concurrently or in reverse order, depending on the functionality involved. In addition, the process descriptions or blocks in flow charts should be understood as representing decisions made by a hardware structure such as a state machine.

The logic of the example embodiment(s) can be implemented in hardware, software, firmware, or a combination thereof. In example embodiments, the logic is implemented in software or firmware that is stored in a memory and that is executed by a suitable instruction execution system. If implemented in hardware, as in an alternative embodiment, the logic can be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc. In addition, the scope of the present disclosure includes embodying the functionality of the example embodiments disclosed herein in logic embodied in hardware or software-configured mediums.

Software embodiments, which comprise an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, or communicate the program for use by or in connection with the instruction execution system, apparatus, or device. The computer readable medium can be, for example but not limited to, an electronic, magnetic, optical, electromagnetic, infrared, or semiconductor system, apparatus, or device. More specific examples (a non-exhaustive list) of the computer-readable medium would include the following: a portable computer diskette (magnetic), a random access memory (RAM) (electronic), a read-only memory (ROM) (electronic), an erasable programmable read-only memory (EPROM or Flash memory) (electronic), and a portable compact disc read-only memory (CDROM) (optical). In addition, the scope of the present disclosure includes embodying the functionality of the example embodiments of the present disclosure in logic embodied in hardware or software-configured mediums.

Although the present disclosure has been described in detail, it should be understood that various changes, substitutions and alterations may be made thereto without departing from the spirit and scope of the invention as defined by the appended claims.

What is claimed is:

1. A method for detecting one or more chroma dropout errors in a current field, the current field associated with a video frame, the method comprising:
    grouping a first plurality of pixels associated with the current field into a first set of pixel pairs;
    calculating a first co-occurrence matrix corresponding to a second set of pixel pairs associated with a previous field, wherein each pixel pair of the second set of pixel pairs corresponds in location to each pixel pair of the first set of pixel pairs, wherein the previous field is a field processed previously having a polarity similar to that of the current field, wherein the second set pixel pairs includes a second plurality of pixels;
    selecting a first pixel pair associated with the first set of pixel pairs, wherein the first pixel pair includes first and second pixels of the first plurality of pixels, wherein the first and second pixels include first and second chroma values, respectively, and wherein the first and second pixels include first and second luma values, respectively;
    selecting a first set of entries of the first co-occurrence matrix based on the first and second chroma values;
    determining a presence of the first pixel pair in the first co-occurrence matrix by analyzing the first set of entries of the first co-occurrence matrix;
    calculating a first absolute difference between the first and second chroma values;
    comparing the first absolute difference with a first predetermined threshold;
    populating a first table that includes one or more chroma values associated with the second plurality of pixels and a count of pixels corresponding to each of the one or more chroma values;
    sorting the first table in an ascending order based on the one or more chroma values;
    selecting a first minimum chroma value from the first table that is a smallest chroma value having a corresponding count of pixels at least one of greater than and equal to a predetermined value;
    selecting a first maximum chroma value from the first table that is a largest chroma value having a corresponding count of pixels at least one of greater than and equal to the predetermined value;
    comparing the first and second chroma values with the first minimum and maximum chroma values;
    calculating a second absolute difference between the first and second luma values;
    comparing the second absolute difference with a second predetermined threshold;
    marking a first template block of a predefined size and having a centre within a first predetermined distance from first and second pixels;
    obtaining a first motion compensated template block in the previous field corresponding to the first template block;
    calculating a first matching metric corresponding to a first plurality of luma values associated with corresponding pixels of the first template block and the first motion compensated template block;
    marking the first pixel pair as erroneous when the first matching metric is less than a third predetermined threshold;
    increasing an error count corresponding to the current field when the first matching metric is less than the third predetermined threshold; and
    marking the current field as erroneous when the error count is greater than a fourth predetermined threshold.

2. The method of claim 1 further comprising:
    calculating a second co-occurrence matrix corresponding to a third set of pixel pairs associated with a subsequent field, wherein each pixel pair of the third set of pixel pairs corresponds in location to each pixel pair of the first set of pixel pairs, wherein the subsequent field is a field processed immediately after processing of the current field having a polarity similar to that of the current field, wherein the third set pixel pairs includes a third plurality of pixels;
    selecting a second set of entries of the second co-occurrence matrix based on the first and second chroma values;
    determining a presence of the first pixel pair in the second co-occurrence matrix by analysing the second set of entries of the second co-occurrence matrix;
    populating a second table that includes one or more chroma values associated with the third plurality of pixels and a count of pixels corresponding to each of the one or more chroma values;
    sorting the second table in an ascending order based on the one or more chroma values associated with the third plurality of pixels;
    selecting a second minimum chroma value from the second table that is a smallest chroma value having a corresponding count of pixels at least one of greater than and equal to the predetermined value;
    selecting a second maximum chroma value from the second table that is a largest chroma value having a corresponding count of pixels at least one of greater than and equal to the predetermined value;
    comparing the first and second chroma values with the second minimum and maximum chroma values;

obtaining a second motion compensated template block in the subsequent field corresponding to the first template block;

calculating a second matching metric corresponding to a second plurality of luma values associated with corresponding pixels of the first template block and the second motion compensated template block;

marking the first pixel pair as erroneous when the first and second matching metrics are less than a third predetermined threshold; and increasing the error count corresponding to the current field when the first and second matching metrics are less than the third predetermined threshold.

3. The method of claim 2, wherein the first and second matching metrics include at least one of sum of absolute differences (SAD), sum of squared differences (SSD), correlation coefficient, and structural similarity (SSIM) index.

4. The method of claim 2, wherein the first and second set of entries have corresponding second and third pixel pairs within a second predetermined distance of the first pixel pair.

5. A method for detecting one or more chroma dropout errors in a current field, the current field associated with a video frame, the method comprising:

grouping a first plurality of pixels associated with the current field into a first set of pixel pairs;

calculating a first co-occurrence matrix corresponding to a second set of pixel pairs associated with a previous field, wherein each pixel pair of the second set of pixel pairs corresponds in location to each pixel pair of the first set of pixel pairs, wherein the previous field is a field processed previously having a polarity similar to that of the current field, wherein the second set pixel pairs includes a second plurality of pixels;

calculating a second co-occurrence matrix corresponding to a third set of pixel pairs associated with a subsequent field, wherein each pixel pair of the third set of pixel pairs corresponds in location to each pixel pair of the first set of pixel pairs, wherein the subsequent field is a field processed immediately after processing of the current field having a polarity similar to that of the current field, wherein the third set pixel pairs includes a third plurality of pixels;

selecting a first pixel pair associated with the first set of pixel pairs, wherein the first pixel pair includes first and second pixels of the first plurality of pixels, wherein the first and second pixels include first and second chroma values, respectively, and wherein the first and second pixels include first and second luma values, respectively;

selecting a first set of entries of the first co-occurrence matrix based on the first and second chroma values;

selecting a second set of entries of the second co-occurrence matrix based on the first and second chroma values;

determining a presence of the first pixel pair in the first and second co-occurrence matrices by analysing the first and second set of entries of the first and second co-occurrence matrices, respectively;

calculating a first absolute difference between the first and second chroma values;

comparing the first absolute difference with a first predetermined threshold;

populating first and second tables that include one or more chroma values associated with the second and third pluralities of pixels, respectively, and a count of pixels corresponding to each of the one or more chroma values associated with the second and third pluralities of pixels, respectively;

sorting each of the first and second tables in an ascending order based on the one or more chroma values associated with the second and third pluralities of pixels, respectively;

selecting a first minimum chroma value from the first table that is a smallest chroma value having a corresponding count of pixels at least one of greater than and equal to a predetermined value;

selecting a first maximum chroma value from the first table that is a largest chroma value having a corresponding count of pixels at least one of greater than and equal to the predetermined value;

selecting a second minimum chroma value from the second table that is a smallest chroma value having a corresponding count of pixels at least one of greater than and equal to the predetermined value;

selecting a second maximum chroma value from the second table that is a largest chroma value having a corresponding count of pixels at least one of greater than and equal to the predetermined value;

calculating a minimum chroma value that is smaller of the first and second minimum chroma values;

calculating a maximum chroma value that is larger of the first and second maximum chroma values;

comparing the first and second chroma values with the minimum and maximum chroma values;

calculating a second absolute difference between the first and second luma values;

comparing the second absolute difference with a second predetermined threshold;

marking a first template block of a predefined size and having a centre within a first predetermined distance from first and second pixels;

obtaining a first motion compensated template block in the previous field corresponding to the first template block;

obtaining a second motion compensated template block in the subsequent field corresponding to the first template block;

calculating a first matching metric corresponding to a first plurality of luma values associated with corresponding pixels of the first template block and the first motion compensated template block;

calculating a second matching metric corresponding to a second plurality of luma values associated with corresponding pixels of the first template block and the second motion compensated template block;

marking the first pixel pair as erroneous when the first and second matching metrics are less than a third predetermined threshold;

increasing an error count corresponding to the current field when the first and second matching metrics are less than the third predetermined threshold; and marking the current field as erroneous when the error count is greater than a fourth predetermined threshold.

6. The method of claim 5, wherein the first and second matching metrics include at least one of sum of absolute differences (SAD), sum of squared differences (SSD), correlation coefficient, and structural similarity (SSIM) index.

7. The method of claim 5, wherein the first and second set of entries have corresponding second and third pixel pairs within a second predetermined distance of the first pixel pair.

8. A system for detecting one or more chroma dropout errors in a current field, the current field associated with a video frame, the system comprising:

a. a pixel-pair creation module for grouping a first plurality of pixels associated with the current field into a first set of pixel pairs;

b. a co-occurrence matrix calculation module for performing steps comprising:
  calculating a first co-occurrence matrix corresponding to a second set of pixel pairs associated with a previous field, wherein each pixel pair of the second set of pixel pairs corresponds in location to each pixel pair of the first set of pixel pairs, wherein the previous field is a field processed previously having a polarity similar to that of the current field, wherein the second set pixel pairs includes a second plurality of pixels; and
  calculating a second co-occurrence matrix corresponding to a third set of pixel pairs associated with a subsequent field, wherein each pixel pair of the third set of pixel pairs corresponds in location to each pixel pair of the first set of pixel pairs, wherein the subsequent field is a field processed immediately after processing of the current field having a polarity similar to that of the current field, wherein the third set pixel pairs includes a third plurality of pixels; and
c. a chroma dropout error identification module, comprising:
  i. Pixel pair search module for performing steps comprising:
    selecting a first pixel pair associated with the first set of pixel pairs, wherein the first pixel pair includes first and second pixels of the first plurality of pixels, wherein the first and second pixels include first and second chroma values, respectively, and wherein the first and second pixels include first and second luma values, respectively;
    selecting a first set of entries of the first co-occurrence matrix based on the first and second chroma values;
    determining a presence of the first pixel pair in the first co-occurrence matrix by analysing the first set of entries of the first co-occurrence matrix;
  ii. Effective minimum and maximum computation module for performing steps comprising:
    populating a first table that includes one or more chroma values associated with the second plurality of pixels and a count of pixels corresponding to each of the one or more chroma values;
    sorting the first table in an ascending order based on the one or more chroma values;
    selecting a first minimum chroma value from the first table that is a smallest chroma value having a corresponding count of pixels at least one of greater than and equal to a predetermined value;
    selecting a first maximum chroma value from the first table that is a largest chroma value having a corresponding count of pixels at least one of greater than and equal to the predetermined value; and
  comparing the first and second chroma values with the first minimum and maximum chroma values;
  iii. Gradient computation and comparison module for performing steps comprising:
    calculating a second absolute difference between the first and second luma values; and
    comparing the second absolute difference with a second predetermined threshold;
    calculating a first absolute difference between the first and second chroma values; and
    comparing the first absolute difference with a first predetermined threshold;
  iv. Template block identification module for marking a first template block of a predefined size and having a centre within a first predetermined distance from first and second pixels;
  v. Motion estimation module for obtaining a first motion compensated template block in the previous field corresponding to the first template block; and
  vi. Matching metric computation module for performing the steps comprising:
    calculating a first matching metric corresponding to a first plurality of luma values associated with corresponding pixels of the first template block and the first motion compensated template block;
    marking the first pixel pair as erroneous when the first matching metric is less than a third predetermined threshold;
    increasing an error count corresponding to the current field when the first matching metric is less than the third predetermined threshold; and
    marking the current field as erroneous when the error count is greater than a fourth predetermined threshold.

9. A computer program product comprising computer-executable instructions embodied in a non-transitory computer-readable medium for use in connection with a processor-containing system, for executing steps comprising:
  grouping a first plurality of pixels associated with the current field into a first set of pixel pairs;
  calculating a first co-occurrence matrix corresponding to a second set of pixel pairs associated with a previous field, wherein each pixel pair of the second set of pixel pairs corresponds in location to each pixel pair of the first set of pixel pairs, wherein the previous field is a field processed previously having a polarity similar to that of the current field, wherein the second set pixel pairs includes a second plurality of pixels;
  calculating a second co-occurrence matrix corresponding to a third set of pixel pairs associated with a subsequent field, wherein each pixel pair of the third set of pixel pairs corresponds in location to each pixel pair of the first set of pixel pairs, wherein the subsequent field is a field processed immediately after processing of the current field having a polarity similar to that of the current field, wherein the third set pixel pairs includes a third plurality of pixels;
  selecting a first pixel pair associated with the first set of pixel pairs, wherein the first pixel pair includes first and second pixels of the first plurality of pixels, wherein the first and second pixels include first and second chroma values, respectively, and wherein the first and second pixels include first and second luma values, respectively;
  selecting a first set of entries of the first co-occurrence matrix based on the first and second chroma values;
  selecting a second set of entries of the second co-occurrence matrix based on the first and second chroma values;
  determining a presence of the first pixel pair in the first and second co-occurrence matrices by analyzing the first and second set of entries of the first and second co-occurrence matrices, respectively;
  calculating a first absolute difference between the first and second chroma values;
  comparing the first absolute difference with a first predetermined threshold;
  calculating minimum and maximum chroma values corresponding to the second and third plurality of pixels associated with the previous and subsequent fields, respectively;
  comparing the first and second chroma values with the minimum and maximum chroma values;

calculating a second absolute difference between the first and second luma values;
comparing the second absolute difference with a second predetermined threshold;
marking a first template block having first and second pixels as diagonal vertices;
obtaining a first motion compensated template block in the previous field corresponding to the first template block;
obtaining a second motion compensated template block in the subsequent field corresponding to the first template block;
calculating a first matching metric corresponding to a first plurality of luma values associated with corresponding pixels of the first template block and the first motion compensated template block;
calculating a second matching metric corresponding to a second plurality of luma values associated with corresponding pixels of the first template block and the second motion compensated template block;
marking the first pixel pair as erroneous when the first and second matching metrics are less than a third predetermined threshold;
increasing an error count corresponding to the current field when the first and second matching metrics are less than the third predetermined threshold; and
marking the current field as erroneous when the error count is greater than a fourth predetermined threshold.

* * * * *